United States Patent Office 3,079,403
Patented Feb. 26, 1963

3,079,403
PROCESS FOR PREPARING AMINES
Joseph Weinstock, Phoenixville, Pa., assignor to Smith Kline & French Laboratories, Philadelphia, Pa., a corporation of Pennsylvania
No Drawing. Filed Sept. 19, 1960, Ser. No. 56,665
8 Claims. (Cl. 260—349)

This invention relates to a new process for preparing amines. More specifically it relates to a novel process for preparing cyclopropyl amines having a substituent in the 2-position from corresponding cyclopropane carboxylic acids via decomposition of the intermediate acid azides. One novel feature of this process is the employment of the lower alkyl mixed anhydride of said cyclopropane carboxylic acid to prepare the intermediate acid azides.

The process of this invention is particularly useful in its application for the stereospecific conversion of cyclopropane carboxylic acids to cyclopropyl amines, that is with retention of the cis or trans configuration due to the geometrical arrangement of the moieties in the 1- and 2-positions with respect to the cyclopropane ring. Thus, a cis or trans cyclopropane carboxylic acid is converted to the corresponding amine with retention of configuration, i.e. without isomerization and/or racemization.

The process can be illustrated more specifically by the following reaction sequence:

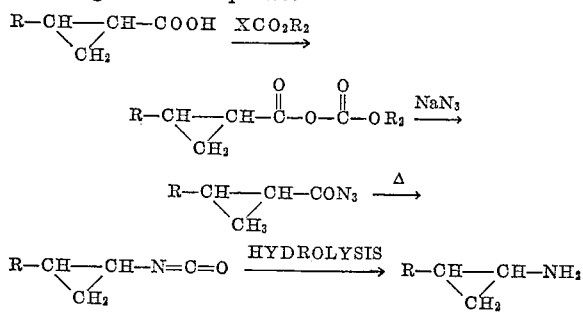

in which:
R is lower alkyl of from 1 to 6 carbon atoms; cyclohexyl; phenyl; substituted phenyl, the substituent being for example halogen of atomic weight less than 80, such as chlorine or bromine, lower alkyl such as methyl, lower alkoxy such as methoxy, trifluoromethyl, hydroxy or methylenedioxy; phenoxy; phenylthio; benzyl; naphthyl; thianaphenyl; indolyl; or benzofuryl;
X is chlorine or bromine; and
$R_2$ is lower alkyl of from 1 to 4 carbon atoms.

As outlined above, the cyclopropane carboxylic acid is reacted with a lower alkyl haloformate to give the corresponding cyclopropyl mixed anhydride. Advantageously, the carboxylic acid is suspended in water, a sufficient amount of a water miscible organic solvent, such as dioxane, dimethylacetamide, dimethylformamide, methyl ethyl ketone and preferably acetone, is added to complete the solution, the solution is cooled to from about 0° C. to about 20° C. and the lower alkyl haloformate is added. The reaction is preferably run in the presence of an organic base, preferably a tertiary amine such as a triloweralkyl amine for example triethylamine or an aromatic or heterocyclic amine for example dimethylaniline, lutidine, picoline or pyridine.

After from 15 to 90 minutes, the mixed anhydride thus formed is treated with sodium azide to give the corresponding cyclopropyl acid azide. Advantageously an aqueous solution of sodium azide is added to the mixed anhydride in situ at from about −5° C. to 10° C. The reaction mixture is stirred for from 30 minutes to two hours and then treated with an excess of ice water. The cyclopropyl acid azide usually separates as an oil and is extracted with a water immiscible organic solvent for example ether.

The acid azide is then thermally decomposed by heating in an inert organic solvent such as toluene or xylene at from about 90° C. to 110° C. to give the corresponding isocyanate. The reaction is advantageously run by heating on a steam bath until the evolution of nitrogen is complete.

The resulting isocyanate is hydrolyzed by treating with a mineral acid such as hydrochloric acid or an alkali metal hydroxide such as sodium or potassium hydroxide at elevated temperatures, conveniently at reflux temperature for from about 3 to 16 hours to give the cyclopropyl amine.

In the prior art, methods of converting a carboxylic acid to an azide via the corresponding acid chloride by treatment with thionyl chloride isomerizes cis cyclopropane carboxylic acids to the trans acids and in some instances results in tar formation. By contrast, the novel process of this invention whereby a carboxylic acid is converted to an azide via a mixed anhydride affords a convenient preparation of acid azides under mild conditions wherein isomerization and decomposition proceed at slow rates. Particularly novel is the employment of a mixed anhydride for the preparation of an acid azide.

The cyclopropyl amines prepared by the process of this invention alter or modify the central nervous system and are useful as ataractic, anti-depressant and hypotensive agents.

The cyclopropane starting materials are either readily available or can be prepared by methods described in the literature and well-known to the art.

The foregoing is a general description of the process of this invention and is equally applicable to cis, trans or cis-trans mixtures of carboxylic acids. It will be readily apparent to one skilled in the art that variations of preparative details are possible. The novel step of employing a mixed anhydride to prepare an acid azide will of course find wide applications and is particularly useful where retention of configuration is desired. Azides are a useful class of compounds having utility in themselves or are convertible to a large variety of compounds by simple reactions [Chemical Reviews, vol. 54, 1(1954)].

The following examples are illustrative of the process of this invention and will serve to make fully apparent all of the compounds preparable thereby.

*Example 1*

A solution of 56.8 g. of trans-2-phenylcyclopropanecarboxylic acid in 100 ml. of water and 250 ml. of acetone is cooled to 0° C. and 50.6 g. of triethylamine in 1 l. of acetone is added. While the temperature is maintained at 0° C. a solution of 54.3 g. of ethyl chloroformate in 250 ml. of acetone is slowly added. The solution is stirred for 30 minutes at 0° C. and then a solution of 52.0 g. of sodium azide in 150 ml. of water is added dropwise. The stirring is continued for one hour and then the mixture is poured into an excess of ice water. The oil which separates is extracted with ether and the combined, dried extract is evaporated in vacuo to leave the oily azide which is dissolved in 500 ml. of toluene. The toluene solution is heated on a steam bath until the evolution of nitrogen is complete and is then evaporated in vacuo to leave the isocyanate. The isocyanate is suspended in 1 l. of 20% aqueous hydrochloric acid and the mixture is refluxed and stirred for four hours. The resulting solution is made basic and extracted with ether. Evaporation of the ether extract leaves the residual trans-2-phenylcyclopropylamine.

Example 2

4-chlorostyrene (48.5 g.) and 70.0 g. of ethyl diazoacetate are mixed carefully at 0° C. The mixture is gradually heated to 160° C. and the exothermic reaction is maintained at this temperature by alternate heating and cooling as required. After the initial exothermic reaction is completed, the mixture is held at 160° C. for four hours. The mixture is distilled under reduced pressure and the fraction, B.P. 126–165° C. at 1–2 mm. is collected. The above fraction is redistilled through a 12″ Vigreux column to give two fractions, B.P. 121–6° C. at 0.8 mm., which is predominately cis-ethyl 2-(4-chlorophenyl)cyclopropanecarboxylate, and B.P. 136–140° C. at 0.8 mm., which is predominately trans-ethyl 2-(4-chlorophenyl)cyclopropanecarboxylate.

To 7.6 g. of trans-ethyl 2-(4-chlorophenyl)cyclopropane carboxylate is added a solution of 5.7 g. of potassium hydroxide in 5.7 ml. of water and 25 ml. of 95% ethanol. The resulting solution is refluxed for four hours and then concentrated in vacuo. The residue is dissolved in 40 ml. of water and the solution adjusted to pH 1 with 10% hydrochloric acid solution. The crystalline precipitate is recrystallized from boiling water to give colorless needles, M.P. 114–116° C., of trans-2-(4-chlorophenyl)cyclopropanecarboxylic acid.

A solution of 19.65 g. of trans-2-(4-chlorophenyl)-cyclopropanecarboxylic acid in 30 ml. of water and 100 ml. of acetone is cooled to 0° C. and 13.2 g. of triethylamine in 250 ml. of acetone is added. A solution of 14.1 g. of ethyl chloroformate in 100 ml. of acetone is added and the solution is stirred for 30 minutes at 0° C. Then a solution of 12.3 g. of sodium azide in 55 ml. of water is added dropwise and the stirring continued for one hour. The reaction mixture is poured into ice water and extracted with ether. The ether extract is evaporated and the residual azide is dissolved in 125 ml. of toluene. The toluene solution is heated on a steam bath until the evolution of nitrogen ceases and is then evaporated in vacuo. The residual isocyanate is suspended in 250 ml. of 20% hydrochloric acid solution and the mixture is refluxed with stirring for four hours. The resulting solution is made basic and extracted with ether. Evaporation of the ether leaves the trans-2-(4-chlorophenyl)cyclopylamine.

Example 3

4-trifluoromethylstyrene (30.0 g.) and 35.0 g. of ethyl diazoacetate are mixed at 0° C. and the mixture gradually heated to 150° C. The reaction is maintained at this temperature for three hours and then the mixture is distilled under reduced pressure. The main fraction is collected which consists of ethyl 2-(4-trifluoromethylphenyl)cyclopropanecarboxylate.

A solution of 11.5 g. of potassium hydroxide in 12 ml. of water and 50 ml. of 95% ethanol is added to 17.6 g. of ethyl 2-(4-trifluoromethylphenyl)cyclopropanecarboxylate. The solution is refluxed for four hours and worked up as described in Example 2 to give after fractional recrystallization the separated isomeric cis- and trans-2-(4-trifluoromethylphenyl)cyclopropanecarboxylic acids.

To a solution of 2.3 g. of cis-2-(4-trifluoromethylphenyl)cyclopropanecarboxylic acid in 10 ml. of water and 20 ml. of acetone cooled to 0° C. is added 1.3 g. of triethylamine in 15 ml. of acetone. A solution of 1.4 g. of ethyl chloroformate in 20 ml. of acetone is slowly added and the solution then stirred for 30 minutes at 0° C. A solution of 1.2 g. of sodium azide in 15 ml. of water is added dropwise and the stirring continued for one hour. Working up the reaction mixture to give the azide followed by decomposition to the isocyanate and acid hydrolysis of the latter as outlined in Example 1 gives cis-2-(4-trifluoromethylphenyl)cyclopropylamine.

Example 4

A solution of 20.6 g. of trans-2-(3,4-methylenedioxyphenyl)cyclopropanecarboxylic acid in 30 ml. of water and 75 ml. of acetone is cooled to 0° C. and 13.2 g. of triethylamine in 250 ml. of acetone is added. Maintaining the temperature at 0° C., a solution of 14.1 g. of ethyl chloroformate in 75 ml. of acetone is slowly added and the solution then stirred for 30 minutes. A solution of 12.3 g. of sodium azide in 100 ml. of water is added dropwise and stirring is continued for one hour. The reaction mixture is worked up as described in Example 1 and similarly the azide is converted to the isocyanate which is hydrolyzed with hydrochloric acid to give the corresponding trans-2-(3,4-methylenedioxyphenyl)cyclopropylamine.

Example 5

2-phenoxycyclopropanecarboxylic acid (12.1 g.) is suspended in 15 ml. of water and 40 ml. of acetone is added to complete the solution. The solution is cooled to 0° C. and 10.1 g. of triethylamine in 190 ml. of acetone is added. While the temperature is maintained at 0° C. a solution of 10.8 g. of ethyl chlorocarbonate in 45 ml. of acetone is slowly added. The mixture is stirred for 30 minutes at 0° C. and then a solution of 10.3 g. of sodium azide in 30 ml. of water is added dropwise and the stirring is continued for one hour at the conclusion of which the mixture is poured into an excess of ice water. The oil which separates is extracted with ether and the combined ether extracts are dried with anhydrous magnesium sulfate. The solvent is removed in vacuo to leave the oily azide which is dissolved in 100 ml. of anhydrous toluene. The toluene solution is heated on a steam bath until the evolution of nitrogen is complete and is then evaporated in vacuo to leave the isocyanate as a red oil. The isocyanate is suspended in 240 ml. of 20% aqueous hydrochloric acid and the mixture is refluxed and stirred for four hours. The resulting solution is concentrated in vacuo to give a crystalline residue. Recrystallization from isopropanol-ether yields colorless crystalline 2-phenoxycyclopropylamine hydrochloride with a melting point of 179–181° C.

The free base is liberated from the above hydrochloride salt by treating an aqueous solution of the salt with 40% sodium hydroxide solution and making the solution strongly alkaline. The oil which separates is extracted with ether and the combined ether extracts are dried with anhydrous magnesium sulfate. Removal of the solvent under reduced pressure yields yellow oily 2-phenoxycyclopropylamine.

Example 6

A mixture of 20 g. of 1-vinylnaphthalene and a slight molar excess of ethyl diazoacetate is heated at 100° C. for two hours then at 140–150° C. for three hours. The mixture is distilled under reduced pressure to give ethyl 2-(naphthyl)cyclopropanecarboxylate, B.P. 98–184° C. at 0.5–2.0 mm. The ester (19 g.) is hydrolyzed with a potassium hydroxide water-alcohol solution at reflux for five hours. The solvents are removed in vacuo and the solid residue taken up in water. The aqueous solution is made acid with hydrochloric acid to separate the free acid. A mixture of 12 g. of 2-(1-naphthyl)cyclopropanecarboxylic acid in water-acetone is cooled to 0° C. while a solution of 15.8 ml. of triethylamine in 190 ml. of acetone is added followed by a solution of 11 ml. of ethyl chloroformate in 45 ml. of acetone at temperature below 5° C. The mixture is stirred and quenched in an ice-water slurry. The water mixture is extracted with ether. The organic extracts are salted out, dried and evaporated at low temperature. The residue is covered with dry toluene and heated on the steam bath until the evolution of gas ceases. The solvent is removed to leave an oil, B.P. 140–143° C. at 0.7 mm., 2-(1-naphthyl)cyclopropane isocyanate.

A mixture of 10 g. of the isocyanate and 249 ml. of 20% hydrochloric acid is stirred and refluxed for 4 hours. After concentration, the residue is shaken with water. After extraction with ether, the aqueous solution is neutralized and extracted again with ether. The residue extracted is dissolved in isopropanol and made acid with hydrochloric acid to give 2-(1-naphthyl)cyclopropylamine hydrochloride, M.P. 213–215° C. from isopropanol ether.

*Example 7*

One mole of salicylaldehyde (122 g.) is dissolved in 400 ml. of ethanol and refluxed with 56 g. of potassium hydroxide until a solution of the potassium salt is obtained. There is then slowly added with stirring 92.5 g. (1 mole) of chloroacetone. When the reaction has subsided, an equal volume of water is added and the resultant mixture distilled to remove excess ethanol. The residual material is extracted with ether and the ethereal solutions dried over magnesium sulfate. Removal of the solvents under reduced pressure to yield a residue and recrystallization of this residue from ethanol yields 2-acetylbenzofuran.

To a suspension of 19 g. (0.5 mole) lithium aluminum hydride in 500 ml. of anhydrous ether is added in a dropwise fashion, 160 g. (1 mole) of 2-benzofurylmethyl ketone in 200 ml. of anhydrous ether. This mixture is refluxed for 1 hour and then decomposed by the dropwise sequential addition of 17 ml. of water, 17 ml. of 10% aqueous sodium hydroxide and 57 ml. of water. The precipitated salts are removed from the solution by filtration and the filtrate concentrated to an oil which upon distillation in vacuo, affords 2-(α-hydroxyethyl)benzofuran.

A solution of 2-(α-hydroxyethyl)benzofuran in 500 ml. of benzene is passed through a vertical stainless steel column (1″ x 18″), which is packed with alumina pellets and maintained at a temperature of 520° C.±10° C. The solvent is next removed under reduced pressure and the residual oil distilled in vacuo to yield 2-vinylbenzofuran.

2-vinylbenzofuran (24.4 g.) and 35.5 g. of ethyl diazoacetate are mixed at 0° C. and the mixture gradually heated to 150° C. The reaction temperature is maintained at this level for 3 hours and the mixture then distilled under reduced pressure. The main fraction thus collected consists essentially of ethyl 2-(2-benzofuryl)-cyclopropanecarboxylate.

A mixture of 25 g. of ethyl 2-(2-benzofuryl)cyclopropanecarboxylate, 8 g. of potassium hydroxide and 200 ml. of 95% ethanol is heated at reflux temperature for 4 hours. The solid is then removed in vacuo and the resultant solid dissolved in water. This aqueous solution is then adjusted to pH 2 by the addition of hydrochloric acid and the precipitate which forms collected by filtration to yield trans 2-(2-benzofuryl)cyclopropanecarboxylic acid. The mother liquor from the above crystallization is concentrated in vacuo to yield cis 2-(2-benzofuryl)cyclopropanecarboxylic acid.

A suspension of 17.9 g. (0.1 mole) of 2-(2-benzofuryl)cyclopropanecarboxylic acid in 70 ml. of water is combined with 50 ml. of acetone. The solution is cooled to 0° C. and 14.9 g. of triethylamine in 230 ml. of acetone are added. The temperature is maintained at 0° C. and a solution of 15.9 g. of ethyl chloroformate in 65 ml. of acetone is slowly added. Upon completion of the addition, the mixture is stirred for 30 minutes at 10° C. and a solution of 15.2 g. of sodium azide in 45 ml. of water is added in a dropwise fashion. The mixture is stirred for an additional hour, after which time it is poured into a excess of ice water. The oil which separates is collected by extracting several times with ether and the combined ethereal extracts are then dried over magnesium sulfate. Solvents are next removed under reduced pressure and the residue dissolved in 100 ml. of anhydrous toluene. This solution is heated on a steam bath until the evolution of nitrogen ceases and the residue then evaporated in vacuo to yield 3-(2-benzofuryl)cyclopropanolisocyanate.

This product is then suspended in 350 ml. of 20% aqueous hydrochloric acid and the mixture is refluxed with stirring for 4 hours. At end of this time the reaction mixture is concentrated in vacuo to a residue, which upon recrystallization from isopropanol and ether yields 2-(2-benzofuryl)cyclopropylamine hydrochloride.

An aqueous solution of this amine hydrochloride is treated with sufficient 40% sodium hydroxide solution to render the solution strongly alkaline and the oil which separates is collected by extractions with ether. These combined ethereal extracts dried over magnesium sulfate and evaporated to a residue consisting of 2-(2-benzofuryl)cyclopropylamine.

*Example 8*

A portion of a cold mixture of 37.4 g. of vinyl cyclohexane and 42.6 g. of ethyl diazoacetate is stirred and heated in an oil bath until the internal temperature reaches 160° C. The remainder of the mixture is added dropwise so as to maintain a brisk evolution of nitrogen. When the addition is complete the heating is continued for four hours, keeping the internal temperature at 150–160° C. The reaction mixture is fractionated through a 6″ Vigreux column to give ethyl 2-cyclohexylcyclopropanecarboxylate, B.P. 69–120° C./0.4–0.7 mm.

A mixture of 30.0 g. of ethyl 2-cyclohexylcyclopropanecarboxylate in 175 ml. of ethanol and 18.4 g. of sodium hydroxide dissolved in 25 ml. of water is refluxed for eight and one-half hours. The reaction mixture is concentrated in vacuo and the residue is dissolved in water. The aqueous solution is extracted with ether and then acidified with concentrated hydrochloric acid. The acidic solution is extracted with ether and the dried ether extract evaporated to give a yellow oil, 2-cyclohexylcyclopropanecarboxylic acid.

A solution of 5.7 g. of 2-cyclohexylcyclopropanecarboxylic acid in 15 ml. of water and 25 ml. of acetone is cooled to 0° C. and 5.1 g. of triethylamine in 100 ml. of acetone is added. At 0° C., a solution of 5.4 g. of ethyl chloroformate in 25 ml. of acetone is slowly added and the solution is stirred for 30 minutes. A solution of 5.2 g. of sodium azide in 25 ml. of water is then added dropwise and the stirring continued for one hour. The reaction mixture is worked up as in Example 1, separating the azide, decomposing to give the isocyanate and hydrolyzing to give 2-cyclohexylcyclopropylamine.

*Example 9*

A mixture of 9.8 g. of 1-heptene and 12.6 g. of ethyl diazoacetate is stirred and heated at 150–160° C. for four hours. The reaction mixture is then fractionated through a Vigreux column to give ethyl 2-n-amylcyclopropanecarboxylate.

A solution of 18.4 g. of ethyl 2-n-amylcyclopropanecarboxylate in 100 ml. of ethanol is treated with 5.2 g. of sodium hydroxide dissolved in 10 ml. of water and the mixture is refluxed for eight hours. The reaction mixture is concentrated in vacuo and the residue is dissolved in water. The aqueous solution is extracted with ether and then acidified with concentrated hydrochloric acid. The acidic solution is extracted with ether and the dried ether extract evaporated to give 2-n-amylcyclopropanecarboxylic acid.

A solution of 10.9 g. of 2-n-amylcyclopropanecarboxylic acid in 30 ml. of water and 50 ml. of acetone is cooled to 0° C. and 10.1 g. of triethylamine in 150 ml. of acetone is added. At 0° C., a solution of 10.8 g. of ethyl chloroformate in 50 ml. of acetone is added and the solution stirred for 30 minutes. A solution of 10.4 g. of sodium azide in 25 ml. of water is added and stirring continued for one hour. Following the procedure of Example 1 and carrying out the steps outlined therein yields finally 2-n-amylcyclopropylamine.

*Example 10*

A solution of 28.4 g. of cis-2-phenylcyclopropanecarboxylic acid in 50 ml. of water and 125 ml. of acetone is cooled to 0° C. and 25.3 g. of triethylamine in 500 ml. of acetone is added. While the temperature is maintained at 0° C. a solution of 54.3 g. of ethyl chloroformate in 250 ml. of acetone is added slowly. The solution is stirred for 30 minutes at 0° C. and then a solution of 26.0 g. of sodium azide in 75 ml. of water is added dropwise. The reaction mixture is stirred for one hour and then is poured into an excess of ice water. The oil which separates is extracted with ether and the dried extract is evaporated in vacuo to give the oily azide which is dissolved in 250 ml. of toluene. The toluene solution is heated on a steam bath until the evolution of nitrogen is complete and is then evaporated in vacuo to leave the isocyanate. The latter compound is suspended in 500 ml. of 20% aqueous hydrochloric acid and the mixture is refluxed and stirred for four hours. The resulting solution is made basic and extracted with ether. Evaporation of the ether extract leaves the residual cis-2-phenylcyclopropylamine.

What is claimed is:
1. The method of preparing cyclopropyl acid azides which comprises reacting a cyclopropane carboxylic acid lower alkyl mixed anhydride with sodium azide.
2. The method of preparing cyclopropyl isocyanates which comprises reacting a cyclopropane carboxylic acid lower alkyl mixed anhydride with sodium azide to give the corresponding acid azide and thermally decomposing said azide.
3. In the method of preparing cyclopropyl amines from corresponding cyclopropane carboxylic acids via decomposition of the intermediate acid azides, the step whereby the corresponding lower alkyl mixed anhydride of said cyclopropane carboxylic acid is reacted with sodium azide to give the said acid azide.
4. The method of preparing cyclopropyl amines having the following structural formula:

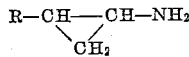

in which R is a member selected from the group consisting of lower alkyl of from 1 to 6 carbon atoms, cyclohexyl, phenyl, substituted phenyl, phenoxy, phenylthio, benzyl, naphthyl, thianaphthenyl, indolyl and benzofuryl, which comprises reacting a cyclopropane carboxylic acid having the following structural formula:

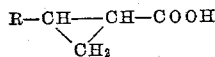

in which R is as defined above with a lower alkyl haloformate to give a cyclopropyl mixed anhydride having the following structural formula:

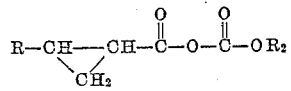

in which R is as defined above and $R_2$ is lower alkyl of from 1 to 4 carbon atoms; reacting said mixed anhydride with sodium azide to give a cyclopropyl acid azide having the following formula:

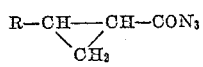

in which R is as defined above; thermally decomposing said azide to give a cyclopropyl isocyanate having the following structural formula:

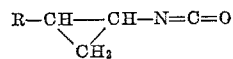

in which R is as defined above; and hydrolyzing said isocyanate.
5. The method of claim 4 characterized in that the lower alkyl haloformate is ethyl chloroformate.
6. The method of claim 4 characterized in that the reaction of the mixed anhydride with sodium azide is run at a temperature in the range of from about −5° C. to about 10° C.
7. The method of claim 4 characterized in that the isocyanate is hydrolyzed with mineral acid.
8. The method of preparing 2-phenylcyclopropylamine which comprises reacting 2-phenylcyclopropanecarboxylic acid with a lower alkyl haloformate to give a 2-phenylcyclopropyl mixed anhydride having the following structural formula:

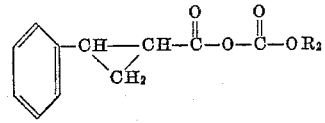

in which $R_2$ is lower alkyl of from 1 to 4 carbon atoms; reacting said mixed anhydride with sodium azide to give 2-phenylcyclopropyl acid azide; thermally decomposing said azide to give 2-phenylcyclopropyl isocyanate; and hydrolyzing said isocyanate.

No references cited.